United States Patent
Tochigi et al.

(10) Patent No.: US 8,350,988 B2
(45) Date of Patent: Jan. 8, 2013

(54) ANTI-GLARE FILM, POLARIZING PLATE AND TRANSMISSION TYPE LCD

(75) Inventors: Kae Tochigi, Tokyo (JP); Yusuke Tochigi, Tokyo (JP); Yasushi Yabuhara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 382 days.

(21) Appl. No.: 12/724,345

(22) Filed: Mar. 15, 2010

(65) Prior Publication Data

US 2010/0238384 A1    Sep. 23, 2010

(30) Foreign Application Priority Data

Mar. 18, 2009 (JP) ................. 2009-066039

(51) Int. Cl.
  *G02F 1/1335* (2006.01)
(52) U.S. Cl. ........................................... 349/64
(58) Field of Classification Search ............ 349/64
  See application file for complete search history.

(56) References Cited

U.S. PATENT DOCUMENTS

| | | | |
|---|---|---|---|
| 2004/0181008 A1* | 9/2004 | Hanazawa et al. | 524/589 |
| 2007/0121211 A1* | 5/2007 | Watanabe et al. | 359/601 |
| 2007/0268587 A1* | 11/2007 | Ninomiya et al. | 359/601 |
| 2008/0137204 A1* | 6/2008 | Yoshinari et al. | 359/599 |

FOREIGN PATENT DOCUMENTS

| | | |
|---|---|---|
| JP | 06-018706 | 1/1994 |
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Phu Vu

(74) *Attorney, Agent, or Firm* — Squire Sanders (US) LLP

(57) ABSTRACT

The present invention provides an anti-glare film which has <1> sufficient anti-reflection properties, <2> a high level of contrast and <3> strong antifouling properties. A surface of an anti-glare layer of the anti-glare film of the present invention has a concave-convex structure, an arithmetic mean roughness (Ra) according to JIS B0601-1994 in the range of 0.02-0.2 μm when a cut-off wavelength (λc) is 0.8 mm, and a surface free energy in the range of 15-25 mN/m. In addition, a haze of the anti-glare layer of the anti-glare film of the present invention is in the range of 1.0-5.0%.

18 Claims, 4 Drawing Sheets

ANTI-GLARE FILM, POLARIZING PLATE AND TRANSMISSION TYPE LCD

CROSS REFERENCE TO RELATED APPLICATION

This application is based on and claims the benefit of priority from the Japanese Patent Application number 2009-066039, filed on Mar. 18, 2009, the entire contents of which are incorporated herein by reference.

BACKGROUND OF THE INVENTION

1. Field of the Invention

The present invention relates to an anti-glare film that can be provided on the surface of a window or a display device. In particular, the invention relates to an anti-glare film that can be provided on the surface of a display device such as a liquid crystal display (LCD), a CRT display, an organic electroluminescent display (ELD), a plasma display (PDP), a surface emission display (SED) and a field emission display (FED) etc.

2. Description of the Related Art

In the field of display devices such as liquid crystal displays, CRT displays, EL displays and plasma displays, an anti-glare film having a concave-convex structure on the surface is known to be provided on the display surface in order to prevent the decrease in visibility caused by reflection of external light on the display surface during viewing.

For example, the following techniques are known as a manufacturing method of an anti-glare film.

A method for forming a concave-convex structure on the surface of an anti-glare film by emboss-processing.

A method of forming a concave-convex structure on the surface of an anti-glare film by coating a coating liquid in which particles are admixed to a binder matrix forming material and dispersed in the binder matrix. In the anti-glare film in which a concave-convex structure is formed on the surface by such methods, since the external light falling on the anti-glare film is scattered by the concave-convex structure of the surface so that the image of external light becomes blurred, the decrease in visibility caused by reflection of external light on the display surface can be prevented.

A variety of techniques are disclosed with respect to anti-glare films having a concave-convex structure on the surface (Patent document 1) including the following techniques, for example.

A technique using a combination of a binder matrix resin, spherical particles and irregular shape particles (Patent document 2).

A technique using a binder matrix resin and particles of a plurality of different diameters (Patent document 3).

A technique in which the cross-sectional area of concavities is specified when using an anti-glare film having surface concavities and convexities (Patent document 4).

In addition, the following techniques are also disclosed.

a technique using internal scattering together with surface scattering, setting the internal haze value (cloudiness) of the anti-glare layer to 1%-15% and setting the surface haze value (cloudiness) to 7%-30% (Patent document 5).

a technique using a binder resin and particles with a diameter of 0.5 μm to 5 μm, and setting the difference in refractive index between the binder resin and the particles to the 0.02 to 0.2 range (Patent document 6).

a technique using a binder resin and particles with a diameter of 1 μm to 5 μm, setting the difference in refractive index between the binder resin and the particles to 0.05-0.15, using an appropriate solvent, and setting the surface roughness within a predetermined range (Patent document 7).

A technique using a binder matrix resin and a plurality of types of particles and setting the difference in refractive index between the resin and the particles to 0.03-0.2 (Patent document 8).

a technique for setting the surface haze (cloudiness) to a value equal to or greater than 3 and setting the difference between a haze in the normal direction and a haze in the direction at ±60° to a value equal to or less than 4 in order to reduce a fall in contrast and a change in hue etc. when changing the angle of field of view (Patent document 9).

Anti-glare films of various configurations developed to attain a variety of objects have thus been disclosed. The performance required for anti-glare films used on the front surface of a display device differs between circumstances in which the displays are used. In other words, an optimum anti-glare film differs depending on the object of use and resolution etc. of the display device. Therefore, anti-glare films of various types corresponding to a variety of objects are needed.

<Patent document 1> JP-A-H06-018706
<Patent document 2> JP-A-2003-260748
<Patent document 3> JP-A-2004-004777
<Patent document 4> JP-A-2003-004903
<Patent document 5> JP-A-H11-305010
<Patent document 6> JP-A-H11-326608
<Patent document 7> JP-A-2000-338310
<Patent document 8> JP-A-2000-180611
<Patent document 9> JP-A-H11-160505

Anti-glare films are arranged on the surface of display devices for a note PC, a desktop PC or a TV. In recent years, display devices for TV are often watched from a distant point by users. Thus, anti-glare films are required to have not only anti-reflection properties which prevent reflection of external light falling in the display but also provide a high level of contrast and visibility to the display devices. In recent years, anti-glare films are also required to have antifouling properties such as wiping off fingerprint smears and sebum etc. which are attached or stuck to a display surface.

Anti-glare films have a concave-convex structure whereby external light is prevented from being reflected on the film surface and anti-glare properties are provided. Conventionally, anti-glare films have not been required to have a high level of antifouling properties since the smears of fingerprints etc. on the film surface were rather indistinctive due to their anti-glare properties. In anti-glare films with a high level of transparency of recent years which aims to improve contrast, however, distinct smears tend be observed on the surface of the concave-convex structure. Thus, an anti-glare film which provides both the high level of contrast and sufficient capability of wiping smears off the surface are required.

It is ordinarily possible to improve surface antifouling properties by decreasing surface free energy. In the case of an anti-glare film with a high level contrast, however, distinct and undesirable smears appear if the surface free energy is simply decreased.

If smears of fingerprints etc. are inserted to the concavities of the concave-convex structure on the surface, it becomes severely difficult to wipe the smears off the anti-glare film. In the anti-glare film with a high level of contrast, there was a problem of distinct appearance of smears inserted to the concavities and highly visible dirtiness.

SUMMARY OF THE INVENTION

Hence, it is an objective of the present invention to provide an anti-glare film having (1) sufficient anti-glare properties, (2) a high level of contrast and (3) a high level of antifouling properties.

In order to solve such a problem described above, a first aspect of the present invention is an anti-glare film including, a transparent substrate and an anti-glare layer, the anti-glare layer having a concave-convex structure on a surface and being arranged on the transparent substrate, the surface of the anti-glare layer having an arithmetic mean roughness (Ra) in the range of 0.02-0.2 μm when a cut-off wavelength (λc) of the surface of the anti-glare layer is 0.8 mm, and a surface energy of the surface of the anti-glare layer being in the range of 15-25 mN/m.

In addition, a second aspect of the present invention is the anti-glare film according to the first aspect of the present invention, wherein a haze of said anti-glare layer is in the range of 1.0-5.0%.

In addition, a third aspect of the present invention is the anti-glare film according to the first and second aspects of the present invention, wherein an average interval between concavities and convexities (Sm) on the surface of the anti-glare layer is in the range of 10-150 μm.

In addition, a fourth aspect of the present invention is the anti-glare film according to the first to third aspects of the present invention, wherein the anti-glare layer contains a fluorocompound having a polymerizable group.

In addition, a fifth aspect of the present invention is the anti-glare film according to the first to fourth aspects of the present invention, wherein the anti-glare layer has an average thickness in the range of 3-12 μm.

In addition, a sixth aspect of the present invention is the anti-glare film according to the first to fifth aspects of the present invention, wherein the anti-glare layer contains a binder matrix and particles, and a difference in refractive index ($|n_A-n_M|$) between the particles and the binder matrix is 0.04 or less.

In addition, a seventh aspect of the present invention is the anti-glare film according to the sixth aspect of the present invention, wherein a content amount of the particles relative to 100 parts by weight of the binder matrix is in the range of 0.5-18.0 parts by weight in the anti-glare layer.

In addition, an eighth aspect of the present invention is the anti-glare film according to the sixth and seventh aspects of the present invention, wherein the binder matrix contains a material made by curing an acrylic material by irradiating ionizing radiation, and the particles contains methyl methacrylate.

In addition, a ninth aspect of the present invention is a transmission type LCD including the anti-glare film according to the first to eighth aspects of the present invention, a first polarizing plate, a liquid crystal cell, a second polarizing plate and a backlight unit, wherein the anti-glare layer is arranged nearest to an observer.

In addition, a tenth aspect of the present invention is a polarizing plate including the anti-glare film according to the first to eighth aspects of the present invention, a polarizing layer and a second transparent substrate, wherein the polarizing layer is arranged on the opposite surface of the anti-glare film from the side on which the anti-glare layer is formed.

In addition, an eleventh aspect of the present invention is a transmission type LCD including the polarizing plate according to the tenth aspect of the present invention, a liquid crystal cell, a second polarizing plate and a backlight unit, wherein the anti-glare layer is arranged nearest to an observer.

The inventors of the present invention found that in order to obtain a high level of antifouling properties it is difficult to sufficiently wipe smears off the anti-glare film by simply decreasing the surface free energy of the anti-glare film. They also found that it is not possible to obtain an anti-glare film having both a high level of contrast and a high level of antifouling properties without making the arithmetic mean roughness Ra in a certain predetermined range so that the present invention is completed.

In other words, the inventors of the present invention discovered that an anti-glare film having both a high level of contrast and a high level of antifouling properties by adjusting the surface free energy of the anti-glare film and the arithmetic mean roughness Ra when the cut-off wavelength λc is 0.8 mm in a predetermined range.

It is possible to obtain an anti-glare film having (1) sufficient anti-glare properties, (2) a high level of contrast and (3) a high level of antifouling properties by adopting the anti-glare film structure of the present invention.

DESCRIPTION OF REFERENCE NUMERALS AND SIGNS (SYMBOLS)

1: Anti-glare film.
11: Transparent substrate. 12: Anti-glare layer.
120: Binder matrix. 121: Particle(s).
H: Average thickness of anti-glare layer.
2: (First) polarizing plate.
21: (First) transparent substrate. 22: (Second) transparent substrate.
23: (First) polarizing layer.
3: Liquid crystal cell.
4: (Second) polarizing plate.
41: (Third) transparent substrate. 42: (Fourth) transparent substrate.
43: (Second) polarizing layer.
5: Backlight unit.
30: Die head. 31: Pipework.
32: Coating liquid tank. 33: Transfer pump. 35: Rotary roll.

DETAILED DESCRIPTION OF THE INVENTION

Figure 1:
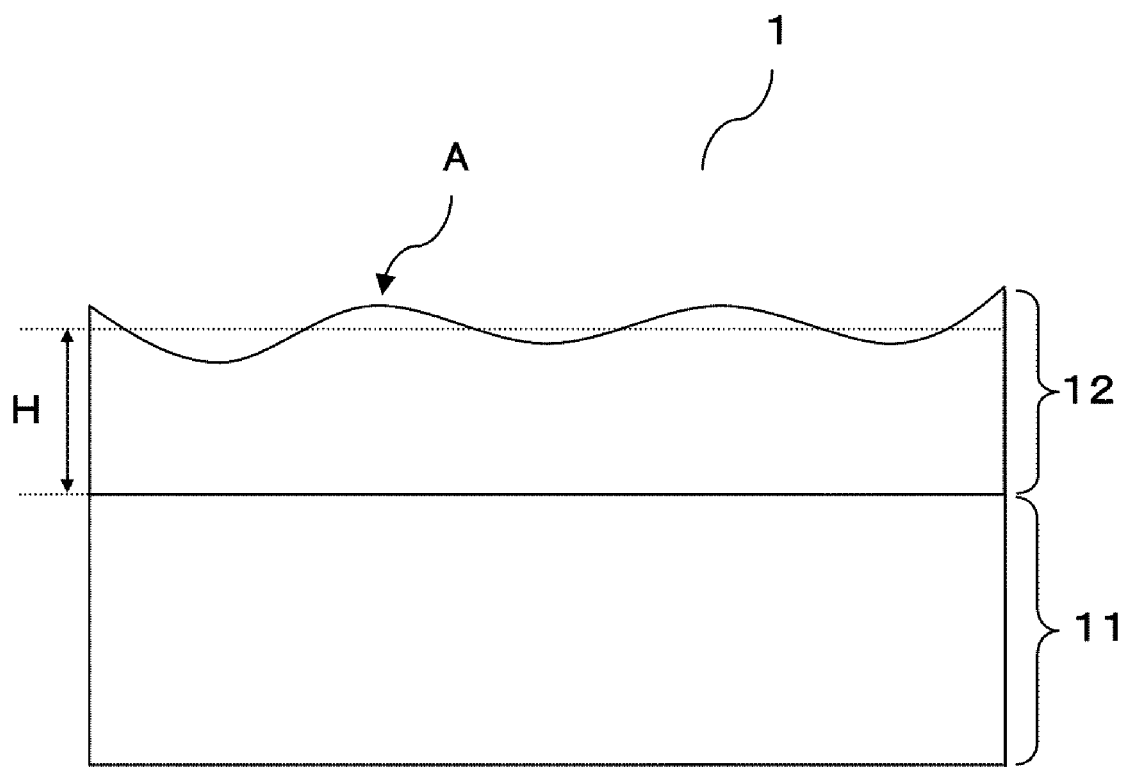
FIG. 1 is a schematic cross-sectional view illustrating an anti-glare film of the present invention.

An anti-glare film of the present invention is described below. FIG. 1 illustrates a cross sectional exemplary diagram of an anti-glare film of the present invention. The anti-glare film includes an anti-glare layer 12 having a concave-convex structure on the surface A of the transparent substrate 11.

It is a feature of an anti-glare film of the present invention that the surface has an arithmetic mean roughness Ra in the range of 0.02-0.2 μm and a surface free energy in the range of 15-25 mN/m when the cut-off wavelength λc is 0.8 mm. At this time, the cut-off wavelength of the anti-glare layer surface in this specification conforms to JIS (Japanese Industrial Standards) B0601-1994.

In the anti-glare film of the present invention, the arithmetic mean roughness Ra of the anti-glare layer surface when the cut-off wavelength λc is 0.8 mm, which conforms to JIS-B0601-1994, is in the range of 0.02-0.2 μm. If the arithmetic mean roughness Ra is smaller than 0.02 μm, it is impossible to make an anti-glare film with sufficient anti-glare properties. If the arithmetic mean roughness Ra is larger than 0.20 μm on the other hand, it becomes difficult to wipe off smears inserted to the concavities of the convex-concave structure on the anti-glare layer surface. Thus, it becomes impossible to provide a high level of antifouling properties to the anti-glare layer. Moreover, if the arithmetic mean roughness Ra significantly exceeds 0.20 μm, it is impossible to make an anti-glare film with a high level of contrast.

In addition, it is a feature of an anti-glare film of the present invention that the surface free energy is in the range of 15-25 mN/m. The surface free energy can be used as an indicator for evaluating the surface antifouling properties. It is possible to estimate the degree of antifouling properties on a surface of an anti-glare film by the surface free energy. The surface free energy can be obtained from a surface contact angle by an extended Fowkes equation. The smaller the surface free energy, the higher the level the antifouling properties are in. In the anti-glare film of the present invention, a higher level of antifouling properties is realized by making the surface free energy 25 mN/m or less. If the surface free energy exceeds 25 mN/m, it is impossible to make an anti-glare film with sufficient antifouling properties. On the other hand, an anti-glare film with a surface free energy smaller than 15 mN/m will be expensive since a large amount of an antifouling material such as a fluorocompound etc. has to be added to the coating liquid for forming an anti-glare layer. In addition, the coating liquid for forming an anti-glare layer may become white and the resultant anti-glare film possibly become whitely clouded, which is unsuitable for applying on a surface of a display device.

It is not possible to make an anti-glare film of the present invention have a high level of antifouling properties by merely adjusting the surface free energy of the anti-glare layer to 25 mN/m or less. It becomes possible to provide the anti-glare film with a high level of antifouling properties which makes it possible to easily wipe off smears inserted to concavities of the convex-concave structure on the anti-glare layer surface by making the arithmetic mean roughness Ra of the anti-glare layer surface 0.2 μm or less along with adjusting the surface free energy of the anti-glare layer to 25 mN/m or less.

In addition, it is preferable in the anti-glare film of the present invention that the haze of the anti-glare layer is the range of 1.0-5.0%. At this time, the haze of the anti-glare layer in this specification conforms to JIS (Japanese Industrial Standards) K7105-1981. In the case where the haze of the anti-glare layer exceeds 5.0%, it may be impossible to make an anti-glare film having a high level of contrast. In the case where the haze of the anti-glare layer is lower than 1.0%, it may be impossible to make an anti-glare film having sufficient anti-glare properties.

The haze of the anti-glare layer can be obtained by subtracting the haze of the parts other than the anti-glare layer from the haze of the entire anti-glare film. In the anti-glare film of FIG. 1, the haze of the anti-glare layer 12 can be obtained by subtracting the haze of the transparent substrate 11 from the haze of the anti-glare film 1. In an anti-glare film of the present invention, by adjusting the haze of the anti-glare layer 5.0% or smaller, it becomes possible not only to improve contrast of a display device when the anti-glare film is applied on a surface of the display device but also to make the parallel light transmittance of incident light to the anti-glare layer with a wavelength of 550 nm at 5 degrees of incident angle a high value. An improvement of the visible light transmittance leads to an improvement in luminance and energy saving of the display device applied with this anti-glare film.

In addition, it is preferable in the anti-glare film of the present invention that an average interval Sm between concavities and convexities on the surface of the anti-glare layer is in the range of 10-150 μm. At this time, the average interval Sm between concavities and convexities on the surface of the anti-glare layer conforms to JIS (Japanese Industrial Standards) B0601-1994. In the case where the average interval Sm between concavities and convexities on the anti-glare layer surface is smaller than 10 μm, the anti-glare film has too strong anti-glare properties and it becomes impossible to obtain an anti-glare film which provides a high level of contrast. In addition, if the concave-convex structure on the surface of the anti-glare layer is formed by admixing particles to the binder matrix, it is difficult to make the average interval Sm between concavities and convexities on the anti-glare layer surface 10 μm or less and still maintain the arithmetic mean roughness Ra on the anti-glare layer surface 0.2 μm or less. On the other hand, in the case where the average interval Sm between concavities and convexities on the anti-glare layer surface exceeds 150 μm, the anti-glare film may have insufficient anti-glare properties.

In addition, it is possible to strongly suppress the glare of the anti-glare film and yet maintain a high level contrast by controlling the average interval Sm between concavities and convexities on the anti-glare layer surface in the range of 10-150 μm. In conventional anti-glare films, the glare is prevented by a method in which the lens effect causing the glare is suppressed by scattering transmission light, namely, a method in which the internal haze of the anti-glare layer is strengthened by forming the anti-glare layer using particles which scatter light well. Such a method, however, has a problem of low contrast because the haze of the entire anti-glare layer is increased by an addition of the particles which scatter light well. In other words, there is a trade-off relation between the prevention of the glare and a high contrast, which are not achieved at one time. It is possible to make an anti-glare film having a significantly low level of glare and yet maintaining a high level of contrast by adjusting the average interval Sm between concavities on the anti-glare layer surface in the range of 10-150 μm.

In addition, it is preferable in an anti-glare film of the present invention that the anti-glare layer includes a fluorocompound having a polymerizable group. It becomes possible in the anti-glare film to make the surface free energy on the anti-glare layer 25 mN/m or less and to provide antifouling properties to the anti-glare layer surface by an addition of a fluorocompound or a silicone compound to the anti-glare layer. In particular, a fluorocompound which has a high level of antifouling properties is preferably used. If the fluorocompound has no polymerizable group, however, the fluorocompound is easily removed once the layer surface is wiped with a cloth etc. because the fluorocompound exists just as if it floats on the layer. Therefore, there is a problem that the antifouling properties are lost once the layer surface is wiped with a cloth etc. In contrast, the present invention utilizes a fluorocompound having a polymerizable group and has an advantage of continuity of antifouling properties even after the anti-glare surface is wiped with a cloth etc. several times because the fluorocompound and the acrylic material which is a major component of the anti-glare layer make bonds together when the anti-glare layer is formed. The fluorocompound having a polymerizable group means a fluorocompound which has a carbon-carbon unsaturated bond and can make bonds together with an acrylic material.

For example, OPTOOL DAC (produced by Daikin Industries, Ltd.), SUA1900L10 and SUA1900L6 (produced by Shin-Nakamura Chemical Co., Ltd.), UT3971 (produced by Nippon Synthetic Chemical Industry Co., Ltd.), DEFENSA TF3001, DEFENSA TF3000 and DEFENSA TF3028 (produced by DIC Corp.), LIGHT-PROCOAT AFC3000 (produced by Kyoeisha chemical Co., Ltd.), KNS5300 (produced by Shin-Etsu Silicones Co., Ltd.), and UVHC1105 and UVHC8550 (produced by GE Toshiba Silicones Co., Ltd.) etc. can be used as the fluorocompound having a polymerizable group of the present invention. However, the present invention is not limited to these and other compounds which make the surface free energy of the anti-glare layer 25 mN/m or smaller can also be used.

In addition, the anti-glare layer in the anti-glare film of the present invention is preferred to have an average thickness H in the range of 3-12 μm. In the case where the average thickness of the anti-glare layer is less than 3 μm, the resultant anti-glare film may have only insufficient hardness for applying on a surface of a display device and it may be impossible to ensure sufficient abrasion resistance. On the other hand, in the case where the average thickness of the anti-glare layer exceeds 12 μm, the production costs become too high and the resultant anti-glare film may also curl too excessively to be suitable for a process for applying on a display device. A more preferable average thickness H of the anti-glare layer is in the range of 4-10 μm.

The average thickness H of the anti-glare layer in the present invention is the average thickness of the anti-glare layer which has a concave-convex structure on the surface. The average thickness can be obtained by an electronic micrometer or an automated microfigure measuring instrument. The average thickness H of the present invention is an average value of five measuring points.

Figure 2:
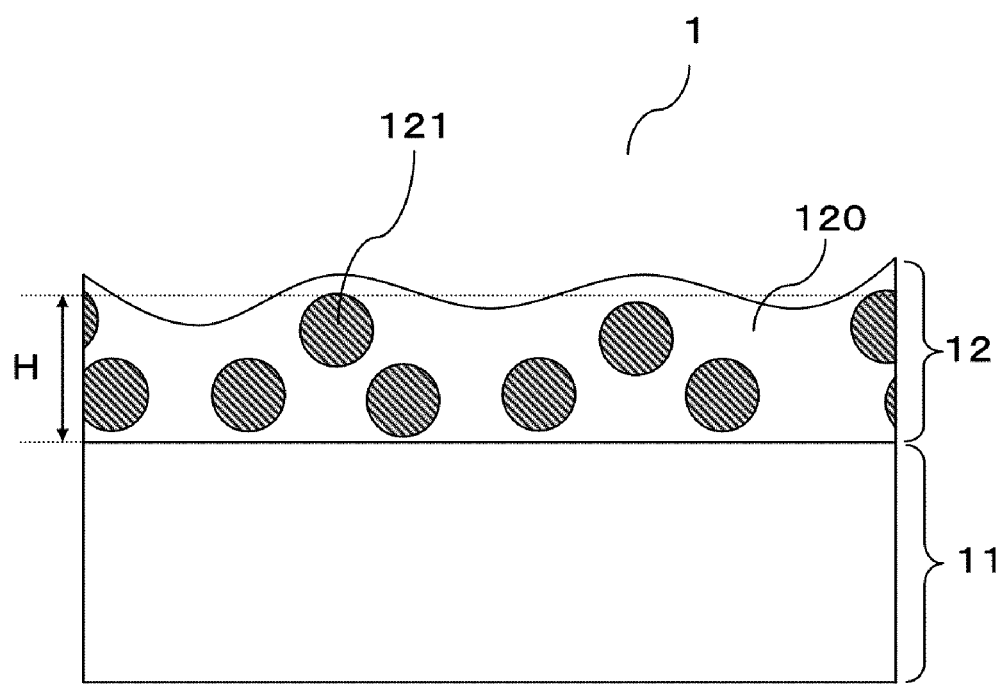
FIG. 2 is a schematic cross-sectional view illustrating another embodiment of an anti-glare film of the present invention.

FIG. 2 illustrates a cross-sectional exemplary diagram of the present invention. The anti-glare film 1 of the present invent has an anti-glare layer 12 on a transparent substrate 11 and the anti-glare layer contains binder matrix 120 and particles 121. It is possible to make an anti-glare film have fewer defects by forming the anti-glare layer admixing particles with binder matrix than in the case of forming an anti-glare layer by an embossing method etc. In addition the anti-glare film is manufactured at a low cost. In the case where an anti-glare film is produced by forming the anti-glare layer by an embossing method etc., defects are periodically produced if there are defects or foreign matters on the embossing mold. In contrast, in the case of the method of forming the anti-glare layer by admixing particles with binder matrix, no such defects are produced.

In the anti-glare film of the embodiment of the present invention, the binder matrix as referred to herein is the component of the anti-glare layer remaining after removing the particles. The binder matrix forming material of the embodiment of the present invention is a material remaining after removing the particles from the solid components of the coating liquid for forming the anti-glare layer. Therefore, the binder matrix forming material can also include, if necessary, an additive such as a photopolymerization initiator and a surface conditioner (or surface adjusting agent) and also a thermoplastic resin in addition to the ionizing radiation curable material (such as an acrylic material).

It is preferable that the anti-glare film of the present invention has an anti-glare layer including a binder matrix and particles. Moreover, it is preferable that a difference ($|n_A - n_M|$) between the refractive index of the particles ($n_A$) and the refractive index of the binder matrix ($n_M$) is in the 0.00-0.04 range. This is because the scatterings which occur in the anti-glare layer due to the admixed particles are preferred to be small. In the case where the difference exceeds 0.04, the scattering and the haze in the anti-glare layer become so large that a display device having an anti-glare film with such an anti-glare layer is liable to have a low level of contrast. It is more preferable that the difference ($|n_A - n_M|$) between the refractive index of the particles ($n_A$) and the refractive index of the binder matrix ($n_M$) is in the 0.00-0.02 range (especially 0.00, which means $n_A = n_M$, is preferable).

The refractive index of the binder matrix ($n_M$) and the refractive index of the particles ($n_A$) can be measured by a Becke line detection method (immersion method).

In addition, it is preferable that the particles content relative to 100 parts by weight of the binder matrix is in the range of 0.5-18.0 parts by weight in the anti-glare film having the anti-glare layer which contains the binder matrix and the particles. It becomes possible to efficiently form the anti-glare layer having a surface with arithmetic mean roughness Ra in the range of 0.02-0.2 μm. It is difficult to provide the anti-glare layer with anti-reflection properties in the case where the particles content is less than 0.5 parts by weight whereas it is difficult to make the anti-glare layer have a surface with a desirable arithmetic mean roughness Ra in the case where the particles content exceeds 18.0 parts by weight.

In addition, it preferable in the anti-glare film of the present invention having the anti-glare layer which contains the binder matrix and the particles that the binder matrix is formed by curing an acrylic material by irradiating ionizing radiation and the particles include methyl methacrylate. Particles of styrene-methyl methacrylate copolymer and particles of methyl methacrylate are examples of such particles. It is possible to provide the anti-glare film with sufficient abrasion resistance for application on a display device by coating an acrylic material as a binder matrix forming material on a transparent substrate and forming the anti-glare layer by irradiating ionizing radiation.

It is preferable that particles containing methyl methacrylate are used as the particles when an acrylic material is used as the binder matrix forming material. In particular, particles of styrene-methyl methacrylate copolymer and particles of methyl methacrylate are preferred to be used. Particles of styrene-methyl methacrylate copolymer and particles of methyl methacrylate can be used well with the binder matrix forming material and it is possible to control a dynamic state of the particles in the binder matrix so that an anti-glare layer having a surface with an arithmetic mean roughness Ra in a desirable range is efficiently formed.

The average particle diameter of the particles in the present invention can be measured by a light scattering particle size distribution analyzer.

If necessary, functional layers having anti-reflection ability, antistatic ability, electromagnetic shielding ability, infrared radiation absorbing ability, ultraviolet radiation absorbing ability, and color correction ability can be provided on the anti-glare film of the present invention besides the anti-glare layer having anti-glare ability. Examples of such functional layers include an anti-reflection layer, an antistatic layer, an electromagnetic shielding layer, an infrared radiation absorbing layer, an ultraviolet radiation absorbing layer, and a color correcting layer. These functional layers may be a single layer or a plurality of layers. The functional layer may have a plurality of functions in one layer, for example, an anti-reflection layer may have antifouling ability. Furthermore, these functional layers may be provided between the first transparent substrate and anti-glare layer or may be provided on the opposite surface of the transparent substrate from the side on which the anti-glare layer is formed. In the present invention, a primer layer and/or an adhesive layer may be provided to improve adhesiveness between the layers.

Figure 3A:
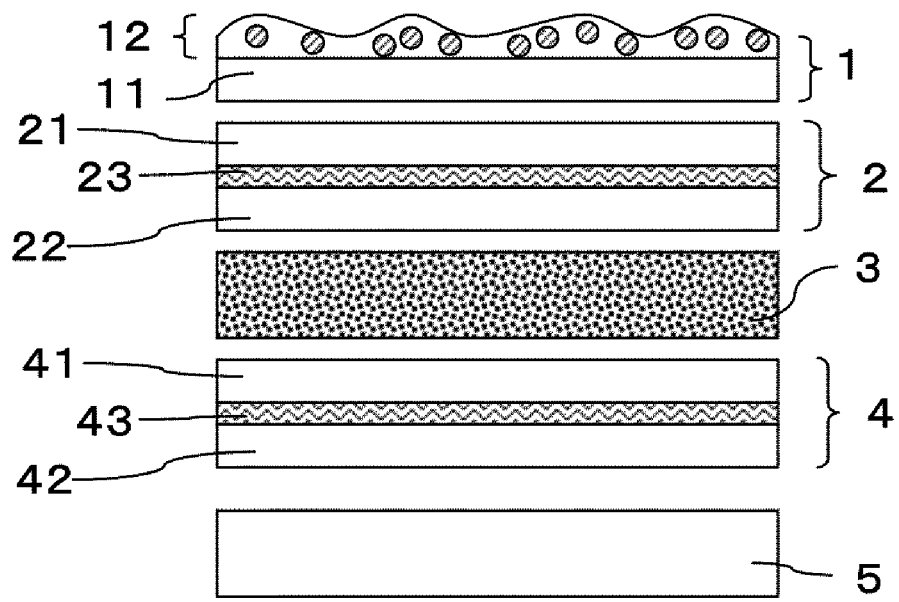
FIGS. 3A and 3B are schematic cross-sectional views illustrating transmission type LCDs using an anti-glare film of the present invention.

FIG. 3 illustrates a cross section exemplary diagram of a transmission type LCD using an anti-glare film of the present invention. The transmission type LCD of FIG. 3A has a backlight unit 5, a second polarizing plate 4, a liquid crystal cell 3, a first polarizing plate 2 and an anti-glare film 1 of the present invention in order. The side on which the anti-glare film 1 is arranged is the observer's side, namely, the surface of the display.

The backlight unit 5 includes a light source and a light diffusion plate. The liquid crystal cell has one electrode on one transparent substrate, and another electrode and a color filter on the other transparent substrate. A liquid crystal is inserted between the electrodes (Not shown in the FIGs.). Each of the first and the second polarizing plates, which are arranged on both sides of the liquid crystal cell 3, has a combined structure of transparent substrates 21,22,41,42 and polarizing layer 23,43 inserted therebetween.

Figure 3B:
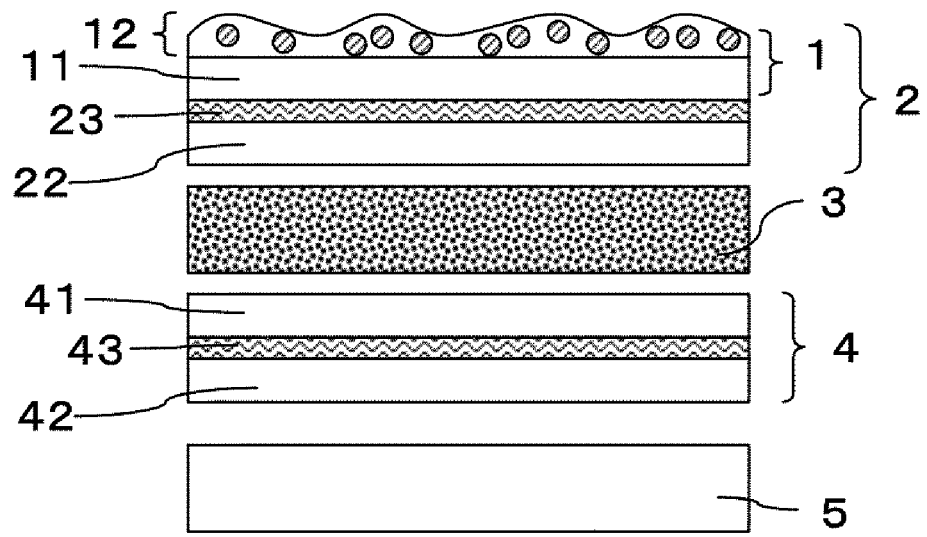

FIG. 3A shows a transmission type LCD in which the transparent substrate 11 of the anti-glare film 1 is separately arranged from the transparent substrate of the first polarizing plate 2. In contrast, FIG. 3B shows an LCD in which the first polarizing layer 23 is arranged on the other side of the transparent substrate 11 of the anti-glare film 1 and the transparent substrate 11 is shared as the transparent substrate of the anti-glare film 1 and as the first transparent substrate of the polarizing plate 2. In other words, a part of the anti-glare film is also a part of the polarizing plate.

It is possible to make anti-glare film 1 of the present invention by arranging the first polarizing layer 23 and the second transparent substrate 22 on the opposite surface of the transparent substrate from the side on which the anti-glare layer 12 is formed as is shown in FIG. 3B.

In addition, a transmission type LCD of the present invention may include other components besides the anti-glare film, the first polarizing plate, the liquid crystal cell, the second polarizing plate and the backlight unit. Although a diffusion film, a prism sheet, a luminance improving film, which efficiently utilize the light from the backlight unit, and a retardation film, which compensates the phase difference caused by the liquid crystal cell or the viewing angle characteristic of the polarizing plate etc., are typically used as such components, the present invention is not limited to these.

Next, a method for manufacturing the anti-glare film of the present invention will be described below.

The method for manufacturing the anti-glare film of the present invention includes at least a step of coating a coating liquid for forming the anti-glare layer that includes a binder matrix forming material that can be cured by ionizing radiation and the organic particles on the first transparent substrate and forming a coating film on the first transparent substrate and a curing step of curing the binder matrix forming material by ionizing radiation, thereby making it possible to form the anti-glare layer on the first transparent substrate.

Glass or a plastic film can be used as the transparent substrate of the present invention. Any plastic film having appropriate transparency and mechanical strength may be used. Examples of suitable films include polyethylene terephthalate (PET), triacetyl cellulose (TAC), diacetyl cellulose, acetyl cellulose butyrate, polyethylene naphthalate (PEN), cycloolefin polymers, polyimides, polyethersulfones (PES), polymethyl methacrylate (PMMA), and polycarbonates (PC). Among them, a triacetyl cellulose (TAC) film can be advantageously used because it has small birefringence and good transparency. In a case where the anti-glare film of the present invention is provided on the surface of a liquid crystal display, it is especially preferred that a triacetyl cellulose (TAC) film be used as the first transparent substrate. It is preferable that the thickness of the transparent substrate is in the range of 25-200 μm and is more preferable in the range of 40-80 μm.

In addition, a transparent substrate 11 which has an anti-glare layer 12 on one surface thereof and a first polarizing layer 23 on the other surface can be used as the polarizing plate of the present invention as is shown in FIG. 3B. In such a case, iodine added elongated polyvinyl alcohol (PVA), for example, can be can be used as the first polarizing layer 23. At this time, the first polarizing layer 23 is interposed between the second transparent substrate 22 and the transparent substrate 11 of the anti-glare film 1.

The coating liquid for forming the anti-glare layer that is used for forming the anti-glare layer at least includes a binder matrix forming material which is curable by ionizing radiation and the particles. At this time, an ionizing radiation curable material can be used as the binder matrix forming material.

For example, an acrylic material can be used as the ionizing radiation curable material for forming the anti-glare layer. A monofunctional or multifunctional (meth)acrylate compound such as an acrylic acid ester or methacrylic acid ester of a polyhydric alcohol, or a multifunctional urethane (meth)acrylate which is synthesized from a diisocyanate and a hydroxyl ester of a polyhydric alcohol and acrylic acid or methacrylic acid can be used as the acrylic material. Besides these, a polyether resin, a polyester resin, an epoxy resin, an alkyd resin, a spyroacetal resin, a polybutadiene resin, or a polythiolpolyene resin having an acrylate or methacrylate functional group can also be used as the ionizing radiation curable material.

In the present invention "(meth)acrylate" means both "acrylate" and "methacrylate". For example, "urethane (meth)acrylate" means both "urethane acrylate" and "urethane methacrylate".

Examples of monofunctional (meth)acrylate compounds include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonylphenol (meth)acrylate, ethylene oxide-modified nonylphenol (meth)acrylate, propylene oxide-modified nonylphenol (meth)acrylate, methoxydiethylene glycol (meth)acrylate, methoxypolyethylene glycol (meth)acrylate, methoxypropylene glycol (meth)acrylate, 2-(meth)acryloyloxy-ethyl-2-hydroxypropyl phthalate, 2-hydroxy-3-phenoxypropyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, trifluoropropyl (meth)acrylate, hexafluoropropyl (meth)acrylate, octafluoropropyl (meth)acrylate, octafluoropropyl (meth)acrylate, and adamantan derivative (meth)acrylates such as adamantyl acrylate that has a monovalent mono(meth)acrylate derived from 2-adamantan and adamantan diol.

Examples of difunctional (meth)acrylate compounds include di(meth)acrylates such as ethylene glycol di(meth)acrylate, diethylene glycol di(meth)acrylate, butane diol di(meth)acrylate, hexanediol di(meth)acrylate, nonandiol di(meth)acrylate, ethoxylated hexanediol di(meth)acrylate, propoxydized hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxypyvalic acid neopentyl glycol di(meth)acrylate.

Examples of (meth)acrylate compounds with a functionality equal to or greater than three include trifunctional (meth)acrylate compounds such as tri(meth)acrylates, e.g., trimethylolpropane tri(meth)acrylate, ethoxylated trimethylolpropane tri(meth)acrylate, propoxydized trimethylolpropane tri(meth)acrylate, tris 2-hydroxyethyl isocyanurate tri(meth)acrylate, glycerin tri(meth)acrylate, and glycerin PO-added triacrylate, and also pentaerythritol tri(meth)acrylate, dipentaerythritol tri(meth)acrylate, and ditrimethylolpropane tri(meth)acrylate, multifunctional (meth)acrylate compounds with a functionality equal to or greater than three include pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate, and multifunctional (meth)acrylate compounds in which some of (meth)acrylates are substituted with an alkyl group or ε-caprolactone.

In addition, a multifunctional urethane acrylate can be used as the acrylic material. Compounds obtained by reacting a polyhydric alcohol, a polyisocyanate, and an acrylate containing a hydroxyl group can be used as the urethane (meth)acrylate compound. Examples of specific compounds include UA-306H, UA-306T, and UA-306I manufactured by Kyoeisha Chemical Co., Ltd., UV-1700B, UV-6300B, UV-7600B, UV-7605B, UV-7640B, and UV-7650B manufactured by Nippon Synthetic Chemical Industry Co., Ltd., U-4HA, U-6HA, UA-100H, U-6LPA, U-15HA, UA-32P, and U-324A manufactured by Shin-Nakamura Chemical Co., Ltd., Ebecryl-1290, Ebecryl-1290K, and Ebecryl-5129 manufactured by Daicel-Cytec Company Ltd., and UN-3220HA, UN-3220HB, UN-3220HC, and UN-3220HS manufactured by Negami Chemical Industrial Co., Ltd. However, this invention is not limited to these examples.

In particular, a trifunctional acrylate monomer or a tetrafunctional acrylate monomer, each of which is an ionizing radiation curable material, is preferred to be used as the binder matrix forming material. It is possible to provide the anti-glare film with sufficient abrasion resistance by using the trifunctional acrylate monomer or the tetrafunctional acrylate monomer. It is preferable that the trifunctional acrylate monomer or the tetrafunctional acrylate monomer is used by 80 wt % or more relative to the entire binder matrix forming material.

In a case where ultraviolet radiation is used as ionizing radiation, a photopolymerization initiator is added to the coating liquid for forming the anti-glare layer. It is preferred that a photopolymerization initiator that is suitable for the material forming the binder matrix be used. Examples of the photopolymerization initiator include benzoin and alkyl ethers thereof such as benzoin methyl ether, benzoin ethyl ether, benzoin isopropyl ether, and benzyl methyl ketal. The amount of the photopolymerization initiator used is 0.5 to 20 parts by weight relative to the binder matrix forming material. The preferred amount is 1 part by weight to 5 parts by weight.

In addition, a thermoplastic resin can be used in addition to the ionizing radiation curable material as the material forming the binder matrix. Examples of suitable thermoplastic resins include cellulose derivatives such as acetyl cellulose, nitrocellulose, acetylbutyl cellulose, ethyl cellulose and methyl cellulose, vinyl resins such as vinyl acetate and copolymers thereof, vinyl chloride and copolymers thereof and vinylidene chloride and copolymers thereof, acetal resins such as polyvinyl formal and polyvinyl butyral, acrylic resin and copolymers thereof, methacrylic resin and copolymers thereof, polystyrene resins, polyamide resins, linear polyester resins, and polycarbonate resins. Adhesion of the first transparent substrate and anti-glare layer can be improved by adding also the thermoplastic resin as the binder matrix forming material. Further, by adding a thermoplastic resin, it is possible to suppress curling of the resultant anti-glare film.

Examples of the particles of the embodiment of the present invention include acrylic particles (refractive index 1.49), acryl styrene particles (refractive index 1.49-1.59), polystyrene particles (refractive index 1.59), polycarbonate particles (refractive index 1.58), melamine particles (refractive index 1.66), epoxy particles (refractive index 1.58), polyurethane particles (refractive index 1.55), nylon particles (refractive index 1.50), polyethylene particles (refractive index 1.50-1.56), polypropylene particles (refractive index 1.49), silicone particles (refractive index 1.43), polytetrafluoroethylene particles (refractive index 1.35), polyfluorovinylidene particles (refractive index 1.42), polyvinyl chloride particles (refractive index 1.54), and polyvinylidene chloride particles (refractive index 1.62). Among these, acryl styrene particles, which are made of copolymers of styrene and methyl methacrylate, and acrylic particles, which are made of methyl methacrylate, can be preferably used.

If necessary, a solvent can be added to the coating liquid for forming the anti-glare layer. By adding a solvent, it is possible to disperse the particles uniformly in the material forming the binder matrix. In addition, it is possible to adjust the viscosity of the coating liquid for forming the anti-glare layer to an appropriate range when the coating liquid is coated on the transparent substrate.

In the case where triacetyl cellulose is used as the transparent substrate and the anti-glare layer is directly formed on the triacetyl cellulose film without other functional layers being interposed therebetween, it is preferred in the present invention that a mixed solvent of a solvent that dissolves the triacetyl cellulose film or causes swelling thereof and a solvent that neither dissolves the triacetyl cellulose film nor causes swelling thereof be used as the solvent for the coating liquid for forming the anti-glare layer. By using the mixed solvent, it is possible to obtain the anti-glare film with sufficient adhesion at the interface of the triacetyl cellulose film and anti-glare layer.

At this time, examples of the solvent that dissolves the triacetyl cellulose film (first transparent substrate) or causes swelling thereof include ethers such as dibutylether, dimethoxymethane, dimethoxyethane, diethoxyethane, propylene oxide, dioxane, dioxolan, tiroxane, tetrahydrofuran, anisole and penetol, some ketones such as acetone, methyl ethyl ketone, diethyl ketone, dipropyl ketone, diisobutyl ketone, cyclopentanone, cyclohexanone and methyl cyclohexanone, esters such as ethyl formate, propyl formate, n-pentyl formate, methyl acetate, ethyl acetate, methyl propionate, ethyl propionate, n-pentyl acetate and γ-butyrolactone, and cellosolves such as methyl cellosolve, cellosolve, butyl cellosolve and cellosolve acetate. These solvents can be used individually or in combinations of two or more thereof.

Examples of the solvent that neither dissolves the triacetyl cellulose film nor causes swelling thereof include aromatic hydrocarbons such as toluene, xylene and cyclohexylbenzene, hydrocarbons such as n-hexane and cyclohexane, and some ketones such as methyl isobutyl ketone and methyl butyl ketone. These solvents can be used individually or in combinations of two or more thereof.

In addition, a fluorocompound or a silicone compound are added in order to make the surface free energy of the anti-glare layer surface 25 mN/m or less in the present invention. In particular, it is preferable that a fluorocompound having a polymerizable group are added. For example, a compound having a fluoroalkyl group (perfluoroalkyl group), which is obtained from an alkyl group by substituting some of the hydrogen atoms with fluorine atoms, and a carbon-carbon unsaturated bond can be used as the fluorocompound having a polymerizable group.

For example, OPTOOL DAC (produced by Daikin Industries, Ltd.), SUA1900L10 and SUA1900L6 (produced by Shin-Nakamura Chemical Co., Ltd.), UT3971 (produced by Nippon Synthetic Chemical Industry Co., Ltd.), DEFENSA TF3001, DEFENSA TF3000 and DEFENSA TF3028 (produced by DIC Corp.), LIGHT-PROCOAT AFC3000 (produced by Kyoeisha Chemical Co., Ltd.), KNS5300 (produced by Shin-Etsu Silicones Co., Ltd.), and UVHC1105 and UVHC8550 (produced by GE Toshiba Silicones Co., Ltd.) etc. can be used as the fluorocompound having a polymerizable group of the present invention. However, the present invention is not limited to these and other compounds which makes the surface free energy of the anti-glare layer 25 mN/m or smaller can also be used.

An additive which is referred to as a surface conditioner may be added in the coating liquid for forming an anti-glare layer in the present invention in order to prevent defective repellency and/or unevenness on the anti-glare layer (the resultant coated layer). The surface conditioner may also be called a leveling agent, an antifoam agent, an interfacial tension conditioner, or a surface tension conditioner according to its function. In whichever case, the surface conditioner weakens the surface tension of the coated layer (the anti-glare layer).

In addition to the above-described surface conditioner, other additives may be also added to the coating liquid for forming the anti-glare layer of the embodiment of the present invention. However, it is preferred that these additives produce no adverse effect on the transparency and light diffusing ability of the anti-glare layer that is formed. Examples of functional additives include an antistat, an ultraviolet absorber, an infrared absorber, a refractive index adjusting agent, an adhesiveness improver, and a curing agent. As a result, functions other than the anti-glare function, such as an antistatic function, an ultraviolet absorption function, and an infrared absorption function can be imparted to the anti-glare layer which is formed.

The coating liquid for forming the anti-glare layer of the embodiment of the present invention is coated on the first transparent substrate to form a coating film. A coating method using a roll coater, a reverse roll coater, a gravure coater, a knife coater, a bar coater, or a die coater can be used as a method for coating the coating liquid for forming the anti-glare layer on the first transparent substrate. Among these coaters, a die coater suitable for high-speed coating in a roll-to-roll system is preferably used. The concentration of solids in the coating liquid differs depending on the coating method. The concentration of solids is preferred to be in the range of 30-70% by weight.

Figure 4:
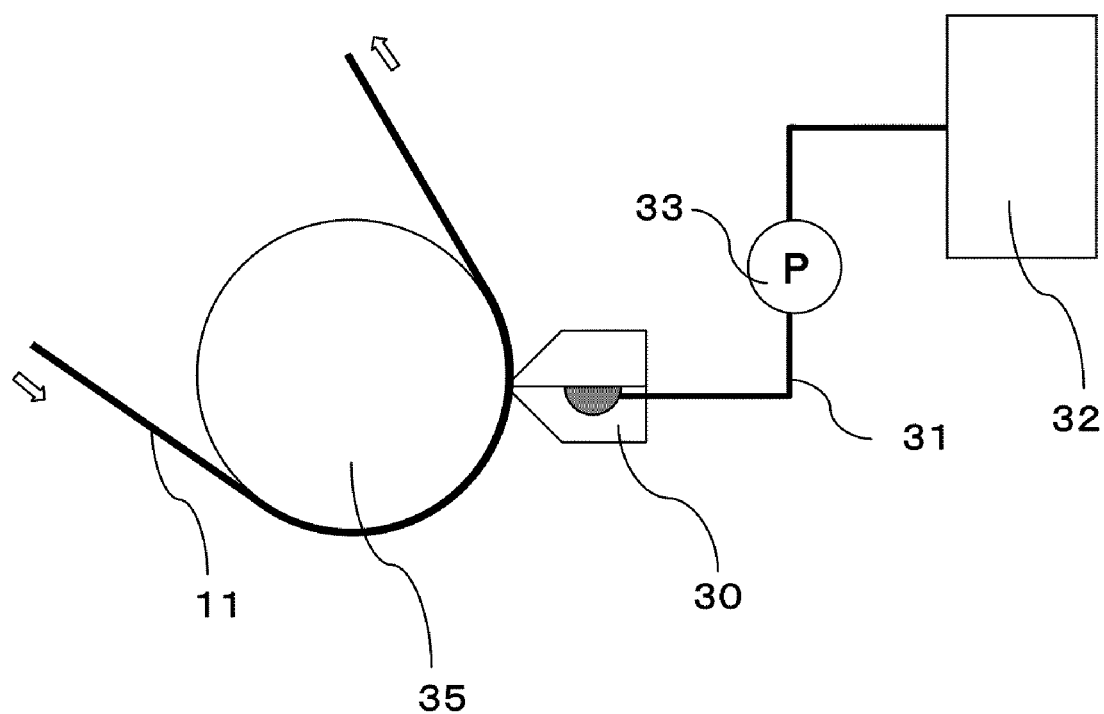
FIG. 4 is a schematic diagram illustrating a die coater coating device which uses an embodiment of the present invention.

Next, a coating apparatus using a die coater of the embodiment of the present invention is described below. FIG. 4 is a schematic cross-sectional view of the die coater coating apparatus of the embodiment of the invention. The die coater coating apparatus of the embodiment of the invention has a structure in which a die head 30 and a coating liquid tank 32 are connected together with a pipework 31, and the coating liquid for forming the anti-glare layer that is located in the coating liquid tank 32 is pumped by a transfer pump 33 into the die head 30. The coating liquid for forming the anti-glare layer that has been pumped into the die head 30 is ejected from a slit gap, and a coating film is formed on the transparent substrate 11. By using the wound transparent substrate 11 and a rotary roll 35, it is possible to form a coating film continuously on the first transparent substrate by a roll-to-roll system.

The anti-glare layer is formed by irradiating the coating film obtained by coating the coating liquid for forming the anti-glare layer on the first transparent substrate with ionizing radiation. Ultraviolet radiation or an electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used.

At this time, a drying process whereby the solvent in the coated liquid is removed may be implemented before and/or after a process of forming the anti-glare layer by curing. Furthermore, curing and drying may be performed simultaneously. In particular, in a case where the coating liquid includes a material of the binder matrix, the particles and the solvent, a drying process has to be implemented before irradiation with ionizing radiation in order to remove the solvent contained in the formed coating film. In other words, the anti-glare layer is formed on the transparent substrate by a sequence of a coating process wherein the coating liquid for forming the anti-glare layer is coated on the transparent substrate, a drying process whereby the coated layer on the transparent substrate is dried and an irradiating process whereby the coated layer is irradiated with ionizing radiation. Examples of suitable drying means are heating, air blowing, and hot air blowing etc.

An anti-glare film of the present invention can be manufactured as described above.

EXAMPLE

Examples are described below.

Example 1

A triacetyl cellulose film (TD-80U made by Fuji Photo Film Corp.) was used as the transparent substrate. 94.5 parts by weight of pentaerythritol triacrylate, which was a trifunctional acrylic material and ionizing radiation curable material, 5 parts by weight of IRGACURE 184 (a product of Ciba Japan), which was a photopolymerization initiator, and 0.5 parts by weight of OPTOOL DAC (a product of Daikin Industries, Ltd.), which was a fluorocompound having a polymerizable group were prepared as the binder matrix forming material.

Particles which were made of styrene-methyl methacrylate copolymer and had 5.0 μm of average diameter and 1.52 of refractive index were used as the particles. In addition, 70 parts by weight of toluene and 30 parts by weight of dioxolan were prepared as the solvent. Then, the binder matrix forming material, the particles and the solvent were mixed together to obtain the coating liquid for forming the anti-glare layer.

The coating liquid for forming the anti-glare layer was coated on the triacetyl cellulose by a die coater so that a coated layer was obtained. The coated layer was subsequently dried to remove the solvent contained in the coated layer. Then the coated layer was cured by irradiating 400 mJ/cm$^2$ of UV under an atmosphere of an oxygen concentration equal to or less than 0.03% so that the anti-glare film having the anti-glare layer on the transparent substrate was obtained. The average thickness (H) of the resultant anti-glare layer was 6.8 μm.

At this time, the average thickness (H) of the anti-glare layer was measured by an electronic micrometer (K351C made by Anritsu Company). In addition, the refractive index of the particles ($n_A$) was measured by the Becke line detection method (the immersion method). Moreover, the average particle size was measured by a light scattering particle size distribution analyzer (SALD-7000 made by Shimadzu Corp.)

Examples 2-9 and Comparative Examples 1-4

Changing the type of fluorocompound contained in the binder matrix forming material as well as the average diameter and content amount of the particles made from a copolymer of styrene and methyl methacrylate from <Example 1>, the anti-glare films of <Example 2> to <Example 9> and <Comparative example 1> to <Comparative example 4> are manufactured.

The same solvent as in the case of <Example 1> was used to prepare the coating liquid for forming the anti-glare layer in <Example 2> to <Example 9> and <Comparative example 1> to <Comparative example 4>. In addition, an identical die coater was used in the examples and comparative examples. The same conditions such as drying condition and UV irradiation condition were adopted as in <Example 1> to make the anti-glare film in <Example 2> to <Example 9> and <Comparative example 1> to <Comparative example 4> except for the amount of coated liquid to obtain various average thicknesses of the anti-glare layer (H). It is noted that a fluorocompound additive F470 (a product of DIC Corporation) which had no polymerizable groups was used in <Comparative example 3>.

Table 1A and 1B show the composition of the coating liquid for forming the anti-glare layer used to make the anti-glare film of <Example 1> to <Example 9> and <Comparative example 1> to <Comparative example 4>. The terms and values which are common to all of the examples and comparative examples are summarized and filled in the table.

TABLE 1A

| | Binder matrix forming material | | | | | | |
|---|---|---|---|---|---|---|---|
| | Acrylic material | | Polymerization initiator | | Fluoro- compound | | Refrac- tive |
| | Type | Parts by weight | Type | Parts by weight | Type | Parts by weight | index ($n_M$) |
| Example 1 | PE3A | 94.5 | 184 | 5.0 | DAC | 0.5 | 1.53 |
| Example 2 | | | | | DAC | | |
| Comparative example 1 | | | | | DAC | | |
| Comparative example 2 | | | | | DAC | | |
| Example 3 | | | | | DAC | | |
| Comparative example 3 | | | | | F470 | | |
| Example 4 | | | | | DAC | | |
| Example 5 | | | | | DAC | | |
| Example 6 | | | | | DAC | | |

TABLE 1A-continued

| | Binder matrix forming material | | | | | | |
|---|---|---|---|---|---|---|---|
| | Acrylic material | | Polymerization initiator | | Fluoro- compound | | Refrac- tive |
| | Type | Parts by weight | Type | Parts by weight | Type | Parts by weight | index ($n_M$) |
| Example 7 | | | | | DAC | | |
| Example 8 | | | | | DAC | | |
| Example 9 | | | | | DAC | | |
| Comparative example 4 | | | | | DAC | | |

PE3A: Pentaerythritol triacrylate
184: IRGACURE 184 (by Ciba Japan)
DAC: Fluorocompound additive OPTOOL DAC (by Daikin Industries, Ltd.)
F470: Fluorocompound additive F470 (by DIC Corporation)

TABLE 1B

| | Particles | | | | |
|---|---|---|---|---|---|
| | Material | Refrac- tive index ($n_A$) | Average particle diameter [μm] | Parts by weight | Solvent |
| Example 1 | PMMA/ styrene | 1.53 | 5.0 | 5.0 | 70 parts by weight of toluene and 30 parts by weight of dioxolane |
| Example 2 | | | 5.0 | 5.0 | |
| Comparative example 1 | | | 5.0 | 5.0 | |
| Comparative example 2 | | | 5.0 | 5.0 | |
| Example 3 | | | 5.5 | 5.0 | |
| Comparative example 3 | | | 5.5 | 5.0 | |
| Example 4 | | | 5.0 | 5.0 | |
| Example 5 | | | 4.5 | 5.0 | |
| Example 6 | | | 6.0 | 3.0 | |
| Example 7 | | | 5.0 | 3.0 | |
| Example 8 | | | 3.0 | 3.0 | |
| Example 9 | | | 5.5 | 5.0 | |
| Comparative example 4 | | | 3.5 | 3.0 | |

PMMA/styrene: Methyl methacrylate-styrene copolymer

The anti-glare films obtained in <Example 1> to <Example 9> and <Comparative example 1> to <Comparative example 4> were measured and evaluated in a way described below. The arithmetic mean roughness (Ra) on the anti-glare layer surface, the surface free energy, the haze, the average interval between concavities and convexities (Sm) on the anti-glare layer surface and the average thickness of the anti-glare layer (H) were measured, and the anti-glare properties, the contrast and the antifouling properties were evaluated.

<Arithmetic Mean Roughness (Ra)>

The arithmetic mean roughness Ra of the anti-glare layer surface of the anti-glare films obtained in <Example 1> to <Example 9> and <Comparative example 1> to <Comparative example 4> was measured in accordance with JIS (Japanese industrial standard)-B0601-1994 using a precision microfigure measuring instrument (SURFCORDER ET4000A made by Kosaka Laboratory Ltd.). The cut-off wavelength was 0.8 mm, the evaluation length was 2.4 mm, and the scanning rate was 0.2 mm/sec.

<Surface Free Energy>

For measuring the surface free energy of the anti-glare layer of the anti-glare films obtained in <Example 1> to <Example 9> and <Comparative example 1> to <Comparative example 4>, a 1.8 mm diameter droplet was made on a needle tip, and the droplet was contacted with and transferred to the surface of the anti-glare layer. Then, the surface free energy was measured using a contact angle meter CA-X manufactured by Kyowa Interface Science Co., Ltd. under a dry condition (20° C. and 65% RH). The contact angle is an angle between the solid surface plane and the plane tangent to the liquid surface at a contact point of the liquid with the solid, and in the present invention, is defined to be the angle of a side which covers the liquid. Each of distilled water and n-hexadecane is used as the liquid. The surface free energy was obtained by the extended Fowkes equation using contact angles of these two liquids.

<Haze (Hz)>

The haze of the anti-glare layer of the anti-glare films obtained in <Example 1> to <Example 9> and <Comparative example 1> to <Comparative example 4> was measured in accordance with JIS (Japanese industrial standard)-K7105-1981 using a haze meter (NDH2000 made by Nippon Denshoku Industries Co., Ltd.). At this time, the haze of the anti-glare layer is obtained by subtracting the haze of triacetyl cellulose, a material of the transparent substrate from the haze of the anti-glare film.

<Average Interval Between Concavities and Convexities (Sm) on the Surface>

The measurement (Cut off=0.8 mm, Evaluation length=2.4 mm, and Scanning rate=0.2 mm/sec.) was performed on each anti-glare layer surface of the anti-glare films obtained in <Example 1> to <Example 9> and <Comparative example 1> to <Comparative example 4> in accordance with JIS (Japanese industrial standard)-B0601-1994 using a precision microfigure measuring instrument (SURFCORDER ET4000A made by Kosaka Laboratory Ltd.).

<Anti-Glare Property>

The anti-glare films obtained in <Example 1> to <Example 9> and <Comparative example 1> to <Comparative example 4> were stuck to a black plastic plate with tackiness agent and visually observed and evaluated from a point 1 meter away. Evaluation criteria were: "double circle" when the observer's face is not reflected on the film, "a circle" when the observer's face is slightly reflected on the film, and "a cross" when the observer's face is apparently reflected on the film.

<Contrast>

The anti-glare films obtained in <Example 1> to <Example 9> and <Comparative example 1> to <Comparative example 4> were stuck to an LCD monitor (FTD-W2023ADSR made by BUFFALO Inc.) and luminances of the LCD during white image display (white luminance) and during black image display (black luminance) were measured by a luminance meter (LS-100 made by Konica Minolta Inc.). The contrast was calculated by dividing the white luminance by the black luminance. The measurement was performed under a dark room environment and a light room environment, in which the illuminance at measurement part was adjusted to 200 lx, respectively. Evaluation criteria were: "a double circle" when a fall rate of the luminance in a state in which the anti-glare film was stuck on the LCD from that in a state in which no anti-glare film was stuck to the LCD was within 1% (black luminance), "a circle" when a fall rate of the luminance in a state in which the anti-glare film was stuck on the LCD from that in a state in which no anti-glare film was stuck to the LCD was within 1% (black luminance) and more than 40% and within 50% (white luminance), and "a cross" when the fall rate of the luminance was over 1% (black luminance) or over 50% (white luminance).

<Antifouling Properties>

Fingerprint smears were stuck on each surface of the anti-glare layer of the anti-glare films obtained in <Example 1> to <Example 9> and <Comparative example 1> to <Comparative example 4>. Then the smears were wiped off with a load of 250 g/cm² using a tissue paper and visually evaluated with respect to easiness of removing the smears. Evaluation criteria were: "double circle" when the smears were removed completely, "a circle" when the smears were removed but wiping marks or trails were left behind, and "a cross" when the smears were not removed.

Table 2A shows the measurement results of the arithmetic mean roughness (Ra) of the anti-glare layer surface, the surface free energy of the anti-glare layer, the haze (Hz) of the anti-glare layer, the average interval between concavities and convexities (Sm) on the surface of the anti-glare layer and average thickness (H) of the anti-glare layer with regard to the anti-glare films of <Example 1> to <Example 9> and <Comparative example 1> to <Comparative example 4>. Table 2B shows the evaluation results of the anti-glare properties, contrast and antifouling properties of the anti-glare films of <Example 1> to <Example 9> and <Comparative example 1> to <Comparative example 4>.

TABLE 2A

|  | Surface roughness (Ra) [μm] | Surface free energy [mN/m] | Haze (Hz) [%] | Average interval between concavities and convexities (Sm) [μm] | Average thickness of anti-glare layer (H) [μm] |
|---|---|---|---|---|---|
| Example 1 | 0.025 | 16.8 | 3.8 | 40 | 6.8 |
| Example 2 | 0.187 | 19.8 | 4.5 | 56 | 4.0 |
| Comparative example 1 | 0.225 | 19.5 | 4.8 | 80 | 3.9 |
| Comparative example 2 | 0.018 | 15.8 | 2.1 | 47 | 8.8 |
| Example 3 | 0.145 | 22.3 | 3.7 | 80 | 5.7 |
| Comparative example 3 | 0.185 | 30.8 | 4.2 | 48 | 6.2 |
| Example 4 | 0.172 | 21.0 | 6.2 | 59 | 4.7 |
| Example 5 | 0.030 | 16.2 | 4.3 | 15 | 4.8 |
| Example 6 | 0.143 | 18.9 | 3.7 | 142 | 5.4 |
| Example 7 | 0.030 | 17.2 | 4.8 | 121 | 10.8 |
| Example 8 | 0.172 | 21.0 | 3.1 | 90 | 3.2 |
| Example 9 | 0.030 | 16.9 | 4.8 | 73 | 12.0 |
| Comparative example 4 | 0.203 | 19.2 | 3.4 | 103 | 2.8 |

TABLE 2B

|  | Anti-glare properties | Contrast | Antifouling properties |
|---|---|---|---|
| Example 1 | ◎ | ◎ | ◎ |
| Example 2 | ○ | ◎ | ○ |
| Comparative example 1 | ○ | X | X |
| Comparative example 2 | X | ◎ | ◎ |
| Example 3 | ○ | ◎ | ○ |
| Comparative example 3 | ○ | ◎ | X |
| Example 4 | ○ | ○ | ○ |
| Example 5 | ○ | ◎ | ○ |
| Example 6 | ○ | ◎ | ○ |
| Example 7 | ○ | ◎ | ◎ |
| Example 8 | ○ | ◎ | ○ |
| Example 9 | ○ | ◎ | ◎ |
| Comparative example 4 | ○ | ◎ | X |

The anti-glare films of the <Example 1> to <Example 9>, which were the anti-glare films of the present invention, had appropriate anti-glare properties, a high level of contrast and a high level of antifouling properties.

In addition, the anti-glare films of the <Example 1> to <Example 9> were arranged on a glass substrate which had a 150 ppi (pixel per inch) BM (black matrix) pattern and was put on a light-table mounting a fluorescent lamp. Then, glares of the anti-glare films were evaluated visually from just above the film. It was concluded that anti-glare films with a high level of contrast and few glares were obtained since no glares were observed on the anti-glare films of <Example 1> to <Example 9>.

In addition, parallel light transmittance of each anti-glare film of <Example 1> to <Example 9> was measured conforming to JIS (Japanese Industrial Standards) K7105-1981 using a spectrophotometer (U-4000 by Hitachi High-Technologies Corp.) at 550 nm as a measurement wavelength, and the results were 80% or more. It was confirmed that the anti-glare films of <Example 1> to <Example 9> had a high level of transmittance.

What is claimed is:

1. An anti-glare film comprising:
a transparent substrate; and
an anti-glare layer, said anti-glare layer comprising a binder matrix and particles, having a concave-convex structure on a surface and being arranged on said transparent substrate, said binder matrix comprising a material made by curing an acrylic material and a fluorocompound having a polymerizable group by irradiating ionizing radiation, said particles consisting of styrene-methyl methacrylate copolymer, said surface of said anti-glare layer having an arithmetic mean roughness (Ra) in the range of 0.02-0.2 μm when a cut-off wavelength (λc) of said surface of said anti-glare layer is 0.8 mm, and a surface energy of said surface of said anti-glare layer being in the range of 15-25 mN/m, wherein a haze of said anti-glare layer is in the range of 1.0-5.0%, and an average interval between concavities and convexities (Sm) on said surface of said anti-glare layer is in the range of 10-150 μm.

2. The anti-glare film according to claim 1, wherein said anti-glare layer has an average thickness in the range of 3-12 μm.

3. The anti-glare film according to claim 1, wherein a difference in refractive index ($|n_A-n_M|$) between said particles and said binder matrix is 0.04 or less.

4. The anti-glare film according to claim 2, wherein a difference in refractive index ($|n_A-n_M|$) between said particles and said binder matrix is 0.04 or less.

5. The anti-glare film according to claim 3, wherein a content amount of said particles relative to 100 parts by weight of said binder matrix is in the range of 0.5-18.0 parts by weight in said anti-glare layer.

6. The anti-glare film according to claim 4, wherein a content amount of said particles relative to 100 parts by weight of said binder matrix is in the range of 0.5-18.0 parts by weight in said anti-glare layer.

7. A transmission type LCD comprising:
said anti-glare film according to claim 1;
a first polarizing plate;
a liquid crystal cell;
a second polarizing plate; and
a backlight unit, wherein said anti-glare layer is arranged nearest to an observer.

8. A polarizing plate comprising:
said anti-glare film according to claim 1;
a polarizing layer; and
a second transparent substrate, wherein said polarizing layer is arranged on the opposite surface of said anti-glare film from the side on which said anti-glare layer is formed.

9. A transmission type LCD comprising:
said polarizing plate according to claim 8;
a liquid crystal cell;
a second polarizing plate; and
a backlight unit, wherein said anti-glare layer is arranged nearest to an observer.

10. The anti-glare film according to claim 1, wherein said particles have an average diameter in the range of 3.0-6.0 μm, and a content ratio of said particles to said binder matrix in said anti-glare layer is in the range of 3.0-5.0 wt %.

11. The anti-glare film according to claim 6, wherein said particles have an average diameter in the range of 3.0-6.0 μm, and a content ratio of said particles to said binder matrix in said anti-glare layer is in the range of 3.0-5.0 wt %.

12. The anti-glare film according to claim 1, wherein said fluorocompound having a polymerizable group includes a perfluoroalkyl group and a carbon-carbon unsaturated bond.

13. The anti-glare film according to claim 11, wherein said fluorocompound having a polymerizable group includes a perfluoroalkyl group and a carbon-carbon unsaturated bond.

14. The anti-glare film according to claim 1, wherein said average interval between concavities and convexities (Sm) on said surface of said anti-glare layer is in the range of 40-121 μm, and said surface of said anti-glare layer has an arithmetic mean roughness (Ra) in the range of 0.025-0.030 μm when a cut-off wavelength (λc) of said surface of said anti-glare layer is 0.8 mm.

15. The anti-glare film according to claim 13, wherein said average interval between concavities and convexities (Sm) on said surface of said anti-glare layer is in the range of 40-121 μm, and said surface of said anti-glare layer has an arithmetic mean roughness (Ra) in the range of 0.025-0.030 μm when a cut-off wavelength (λc) of said surface of said anti-glare layer is 0.8 mm.

16. A transmission type LCD comprising:
said anti-glare film according to claim 15;
a first polarizing plate;
a liquid crystal cell;

a second polarizing plate; and a backlight unit, wherein said anti-glare layer is arranged nearest to an observer.

17. A polarizing plate comprising:

said anti-glare film according to claim 15;

a polarizing layer; and a second transparent substrate, wherein said polarizing layer is arranged on the opposite surface of said anti-glare film from the side on which said anti-glare layer is formed.

18. A transmission type LCD comprising:

said polarizing plate according to claim 17;

a liquid crystal cell;

a second polarizing plate; and a backlight unit, wherein said anti-glare layer is arranged nearest to an observer.

* * * * *